United States Patent [19]
Oami et al.

[11] Patent Number: 5,413,419
[45] Date of Patent: May 9, 1995

[54] PRINTER, A PRINTER CONTROL SYSTEM AND METHOD

[75] Inventors: Michiyoshi Oami, Sagamihara; Hiroo Fujisaki, Hadano, both of Japan

[73] Assignee: Hitachi, Ltd., Tokyo, Japan

[21] Appl. No.: 29,132

[22] Filed: Mar. 10, 1993

[30] Foreign Application Priority Data

Mar. 16, 1992 [JP] Japan ................... 4-057683

[51] Int. Cl.$^6$ ............................................. G06F 13/00
[52] U.S. Cl. ........................................ 400/61; 400/74; 395/116
[58] Field of Search ............. 400/61, 74, 76, 121; 345/115, 116

[56] References Cited

FOREIGN PATENT DOCUMENTS

| | | | |
|---|---|---|---|
| 64-047566 | 2/1989 | Japan | 400/74 |
| 141763 | 6/1989 | Japan | 400/121 |
| 1-202467 | 8/1989 | Japan | 400/74 |
| 3-026561 | 2/1991 | Japan | 400/74 |
| 65264 | 3/1992 | Japan | 400/121 |

*Primary Examiner*—David A. Wiecking
*Assistant Examiner*—Steven S. Kelley
*Attorney, Agent, or Firm*—Fay, Sharpe, Beall, Fagan, Minnich & McKee

[57] ABSTRACT

A printer which comprises a buffer memory for temporarily storing therein new print data, a full dot memory for holding therein a dot-developed print data in a dot pattern on a page basis, a buffer memory management table for managing the state of the print data of the buffer memory on the page basis, and a control means. The control means, when it is desired to store the new print data in the buffer memory, judges whether or not a page of the new print data is the same as a page of print data whose printing is not completed or being discharged. When the control means determines that the page of the new print data is the same as that of the print data being discharged, the control means stores the new print data in the buffer memory immediately after the dot development of the print data of the buffer memory on the full dot memory is completed. When the control means determines that the page of the new print data is not same as that of the print data being discharged, the control means waits until the print data of the buffer memory is printed and the discharging of the printed sheet is completed, after which the control means stores the new print data in the buffer memory. When a paper jam is detected and the above decision is the same page, the recovery of the paper jam is carried out from the print data of the full dot memory; while when the above decision is not the same page, the recovery is carried out from the print data of the buffer memory.

20 Claims, 6 Drawing Sheets

PRINTER, A PRINTER CONTROL SYSTEM AND METHOD

BACKGROUND OF THE INVENTION

The present invention relates to a printer and more particularly, to a technique for enabling printing operation of print data with use of suitable sizes of buffer memory and full dot memory even when the amount of print data corresponding to one page becomes large.

The present invention further relates to a technique which can effectively applied to a cut-sheet printer which, when a printing cut sheet jam occurs and it is desired to again start its printing operation from the jam occurrence page, can ensure the printing from the jam occurrence page.

In a conventional printer of the type referred to above, when a paper jam (abnormal paper feed) takes place during continuous printing operation, the jam occurrence page print data and the subsequent page print data fail to be printed out. This is recovered usually by again printing these data after the jam fault has been removed.

For example, a printer disclosed in JP-A-64-47566 comprises a data memory which has a capacity of being able to store more than one page print data and thus can reprint a paper jam occurrence page on the basis of the print data stored in the data memory.

Another printer disclosed in JP-A-3-26561 is provided with a means for storing therein page positions on a data memory for storing print data in a data output order, so that when it became necessary to return the current page number due to the occurrence of a paper jam, the contents of the storage means are referred to and necessary print data is extracted from the data memory for its reprinting operation.

Further, in a paper jam recovery system of a printer disclosed in JP-A-1-202467, there are provided a bit map memory for storing bit data to be written in a drum of the printer and a backup memory for saving the bit data written in the bit map memory as associated with its page number, so that, in case of a paper jam, reprinting operation is carried out over the jam occurrence page with use of the data from the backup memory.

In this way, in order to ensure the printed result of the print data including the jam occurrence page data even when a paper jam occurs, such means and memories as mentioned above are provided.

The aforementioned prior art techniques, however, cannot recently cope with such a paper jam problem, because one page of print data requires various sorts of data such as not only letter data but also graphics data and image data and also requires a page description language. In this way, the prior art techniques cannot cope with the needs of a recent tendency of an increasingly large amount of data to be handled.

For example, when the amount of data corresponding to one page is increased, the data memory or print data memory in the printer of the JP-A-64-47566 or JP-A-3-26561 must have a much larger memory capacity.

Further, in these prior art systems, an upper data limit per page is not determined, that is, when print data exceeding the memory capacity are handled, the print data memory cannot store all the print data therein. Thus, even when a paper jam occurs, reprinting for the jam occurrence page cannot be attained and the printed result cannot be ensured.

Meanwhile, a cut sheet, double-side printer enabling high speed printing generally has a plurality of bit map memories for the double sides. For this reason, when the paper jam recovery system of the printer of JP-A-1-202467 is applied to the double-side printer, the double-side printer must have a plurality of backup memories.

Accordingly, the prior art technique has a problem that, when it is desired to handle a mixed media data of letters, graphics and image data, a variation in the amount of print data per page, in some cases, becomes as large as to reach megabyte, so that the capacity of the page buffer as its upper limit cannot be determined.

In addition, the prior art technique is also defective in that a plurality of full dot memories are necessary for printing control and the capacity of each memory is usually about 2 megabytes, so that, when a backup memory is provided for the full dot memories to save pages, the capacity of the backup memory must be several megabytes, which leads to an increased cost.

SUMMARY OF THE INVENTION

It is therefore an object of the present invention to provide a printer, even when the amount of print data per page as an upper limit is not determined, which can perform its printing operation with use of only a page buffer and a full dot memory each having a suitable capacity, and also to provide a method by which the printer is implemented. A major object of the present invention is to provide a printer, even when a paper jam occurs, which can ensure the re-printing operation of a jam occurrence page and the subsequent pages, and also to provide a method by which the printer is implemented.

The above objects, other objects and novel features of the present invention will be obvious from the detailed explanation of the present invention and the accompanying drawings.

Typical ones of aspects of the present invention are summarized as follows.

In accordance with an aspect of the present invention, there is provided a printer which comprises: a buffer memory for temporarily storing therein print data; a drawer for receiving the print data from the buffer memory and for developing the print data in a dot pattern; a full dot memory for storing therein the dot pattern developed by the drawer on a page basis; a buffer memory management table for managing a page state of the print data; a printer mechanism for feeding a sheet to a predetermined print position and for receiving the dot pattern from the full dot memory to perform its printing operation; and a controller for controlling the buffer memory, the drawer and the full dot memory on the basis of contents of the buffer memory management table, and wherein, when it is desired to store new print data in the buffer memory, the controller judges on the basis of contents of the buffer memory management table a first state when there is not empty area for the new print data to be stored therein in the buffer memory, a second state when print data of a page being discharged and different from a page of the new print data,is present in the buffer memory, or a third state when the print data of the page being discharged and the same as the page of the new print data is present in the buffer memory; stores the new print data in the buffer memory after discharge of a sheet of the page being discharged is completed when the print data of the page being discharged and different from the page of the new print data is present in the buffer memory;

develops the print data stored in the buffer memory on the full dot memory in a dot pattern when the print data of the page being discharged and the same as the page of the new print data is present in the buffer memory; and after completion of the development, stores the new print data in the buffer memory while holding the dot pattern in the full dot memory.

In accordance with another aspect of the present invention, there is provided a printer which comprises an abnormality detector for detecting a print abnormality occurred in the printer, and wherein the controller, in response to detection of the print abnormality, restarts the printing operation from the print data stored in the buffer memory when the print data of the page being discharged and different from the page of the new print data is present in the buffer memory, while restarts the printing operation from the print data hold in the full dot memory when the print data of the page being discharged and the same as the page of the new print data is present in the buffer memory.

Further, when it is desired to actually print with use of the printer, the controller, when the print data of the page being discharged and different from the page of the new print data is present in the buffer memory, reads out the dot pattern from the full dot memory by a READ & CLEAR method and sends it to the printer mechanism, while, when the print data of the page being discharged and the same as the page of the new print data is present in the buffer memory, reads out the dot pattern from the full dot memory by a READ-ONLY method and sends it to the printer mechanism.

The printer further comprises a counting means for counting the number of printed sheets already discharged, and wherein the controller judges on the basis of information reported from the counting means whether or not the page present in the buffer memory is the page whose discharge is completed.

With such a printer as mentioned above, since the control means is provided for restarting the printing operation from the print data saved in the page buffer or full dot memory on the basis of the print data of the page buffer being discharged, the recovery of the paper jam can be attained with use of the page buffer and full dot memory of the printer. In addition, even with respect to print data exceeding the capacity of the page buffer, the present printer can cope with it through page storage.

Further, since the counting means is provided, the counting means can be incremented when a pick-up command issued from the printer controller and be decremented when the sheet is discharged in the stacker, so that, when a paper jam occurs, the counting means can show the number of pages not discharged yet, the reprint start page after the occurrence of the paper jam can be found, and further the completion of sheet discharge can be known be detecting the completion of discharge of all the sheets picked up.

Typical ones of the effects of the present invention are as follows.

The control means is provided, when it is desired to store new print data in the page buffer, which can judge a first state when the print data of a page being discharged and different from the page of the new print data is present in the page buffer or a second state when one page of print data exceeding the capacity of the page buffer and the same as the page of the print data being discharged is present in the page buffer, and which can restart the printing operation from the print data saved in the page buffer or full dot memory on the basis of the print data of the page buffer being discharged. As a result, the use of the page buffer and full dot memory enables the recovery of a sheet jam. In addition, even when the print data exceeds the capacity of the page buffer, the present invention can cope with it through the page storage.

As a result, there can be realized a printer which has special hardware, can independently start the reprinting operation from the paper jam occurrence page, and also can ensure the print data after the recovery of the paper jam even when the print data exceeds the capacity of the page buffer.

DESCRIPTION OF THE PREFERRED EMBODIMENTS

Figure 1:
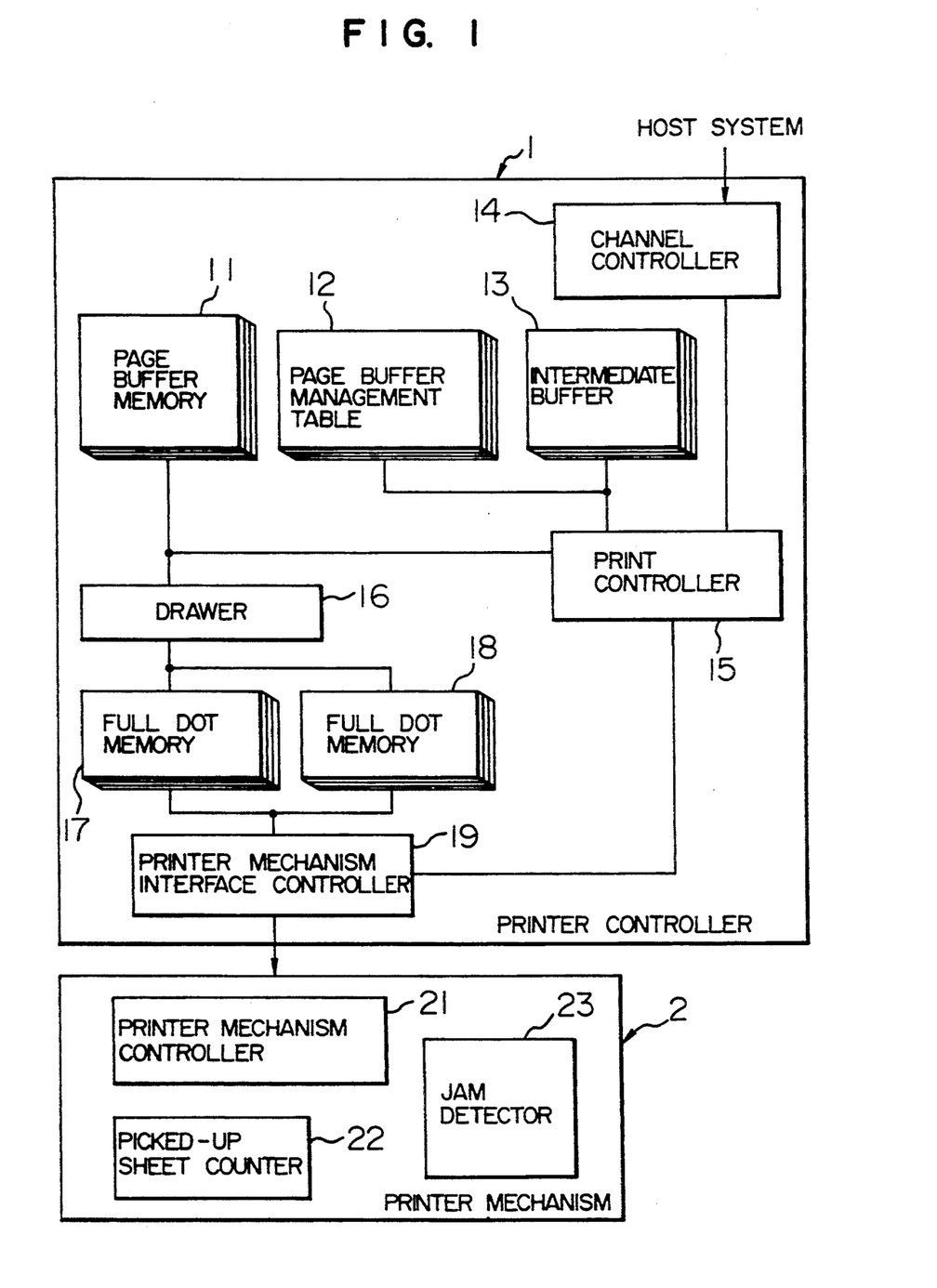
FIG. 1 is an arrangement of a printer in accordance with an embodiment of the present invention.

The arrangement of a printer in accordance with an embodiment of the present invention will be detailed by referring first to FIG. 1 of the accompanying drawings.

The printer of the present embodiment comprises a printer controller 1 and a printer mechanism 2. The printer controller 1 includes a plurality of page buffers for storing therein, e.g., print data corresponding to a plurality of pages and groups of full dot memories for saving therein the print data as dot patterns each corresponding to each page. The printer controller 1 functions to store and edit data received from a host system and to control a print output. The printer mechanism 2 functions to produce a print output under control of the printer controller 1.

The printer controller 1 also includes a page buffer memory 11 for storing therein print data corresponding to a plurality of pages, a page buffer management table 12 having entries corresponding to a plurality of pages, each entry indicating information for managing and controlling the print data of the page buffer memory 11 on a page basis, and an intermediate buffer 13 for temporarily storing therein the print data received from the host system prior to storing it in the page buffer memory.

Further included in the printer controller 1 are a channel controller 14 for controlling the reception and transmission of data from and to the host system, a print controller 15 for performing general control over the printing operation, a drawer 16 for developing the print data stored in the page buffer memories 11 in a dot pattern, a full dot memory 17 for storing therein one page of dot pattern, and a second full dot memory 18 for storing therein the dot pattern generated at the drawer 16. The use of either one of the full dot memories 17 and 18 is controlled by an instruction from the print controller 15, and a memory head pattern is issued from the drawer 16 on the basis of the instruction received from the print controller 15.

The printer controller 1 also includes a printer mechanism interface controller 19 which performs control of sending a sheet pick-up instruction to the printer mechanism 2 according to an instruction received from the print controller 15, performs control of reading the full dot memory 17 (or 18) and sending a read dot pattern to the printer mechanism 2, and also performs control of reading the count of sheets already picked up.

There are two ways of reading the full dot memory 17 (or 18), viz., sequentially reading the full dot memory while clearing the already read data (which will be abbreviated to the READ & CLEAR method, hereinafter) and reading the full dot memory while not clearing the already read data (which will be abbreviated to the READ-ONLY method, hereinafter). The use of which one of the above two methods is determined by an instruction of the print controller 15.

On the other hand, the printer mechanism 2 includes a printer mechanism controller 21 for controlling various sorts of operations within the printer mechanism 2 and also for communicating with the printer mechanism interface controller 19, a pick-up sheet counter 22 for incrementing its count value by "+1" according to the sheet pick-up instruction received from the printer mechanism interface controller 19 and decrementing the count value by "−1" when the discharging of the sheet is completed, and a jam detector 23 for detecting a sheet jammed state.

Figure 2:
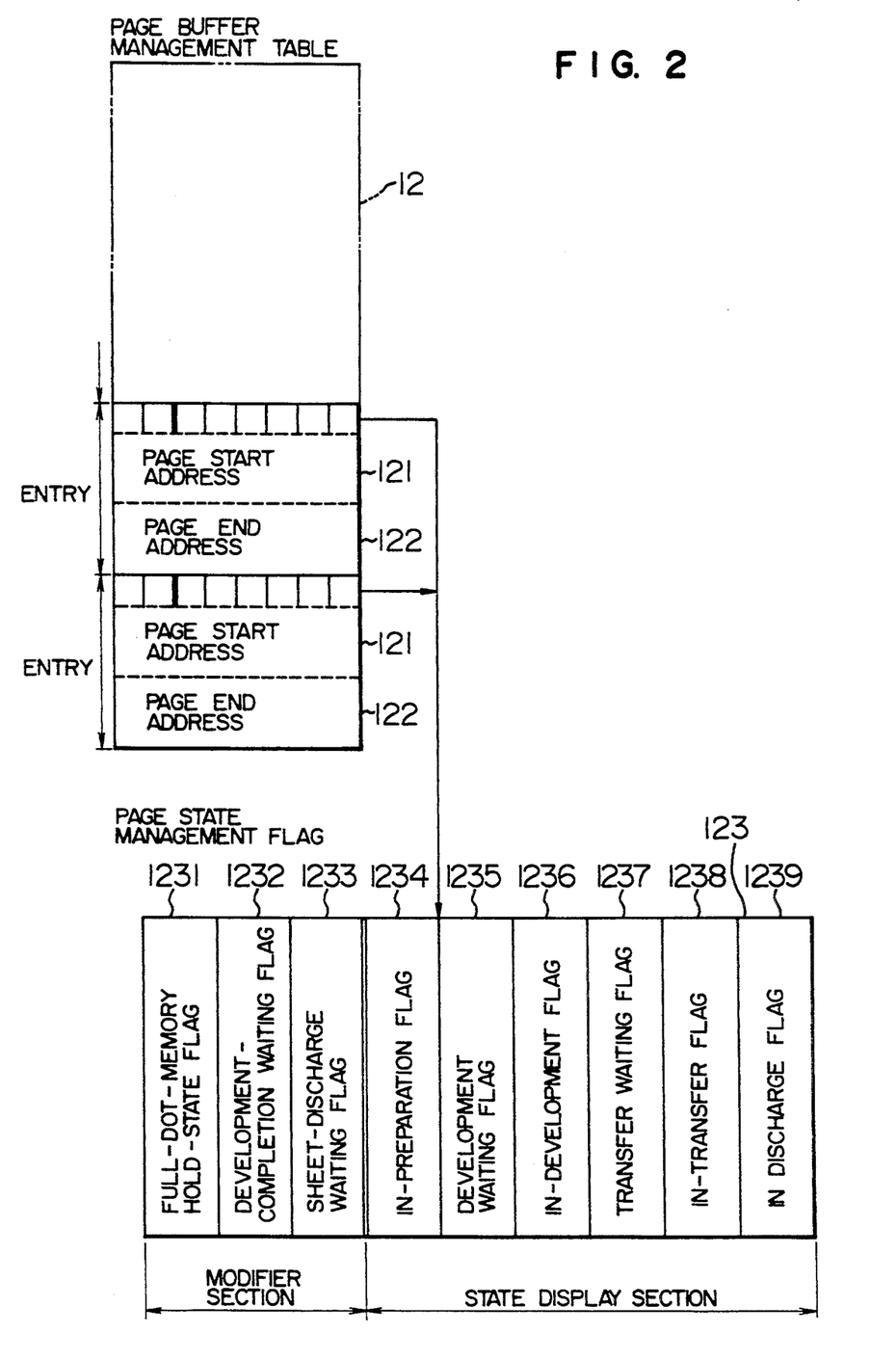
FIG. 2 is a diagram for explaining a page buffer management table in the printer of the present embodiment.

Explanation will next be made as to the structure of the page buffer management table 12 with reference to FIG. 2.

The page buffer management table 12 has a plurality of entries which indicate one format of the page buffer management table 12. Each of the entries comprises a page start address 121 and page end address 122 both indicative of a print data range of the page buffer memory 11 corresponding to one page, and a page state management flag 123 indicative of the printed state of the page.

The contents of the page state management flag 123 is divided into a state display section and modifier section. The state display section is further divided into an in-preparation part 1234, a development waiting part 1235, an in-development part 1236, a transfer waiting part 1237, an in-transfer part 1238 and an in-sheet-discharge part 1239. The modifier section, on the other hand, is further divided into a sheet-discharge waiting part 1233, a development-completion part 1232 and a full-dot-memory hold-state part 1231.

For example, the in-preparation flag 1234 in the state display section is turned "ON" when the storage of the print data of the page into the page buffer memory 11 is started while the in-preparation flag 1234 is turned "OFF" when the storage of one page of the print data in the memory 11 is completed. The development waiting flag 1235 is turned "ON" when the storage of one page of print data in the memory 11 is completed while the development waiting flag 1235 is turned "OFF" when the development of the print data on the full dot memory 17 is started. Further, the in-development flag 1236 is turned "ON" when the development of the page on the full dot memory 17 is started while turned "OFF" when the development is completed.

The transfer waiting flag 1237 is turned "ON" when the development of one page of print data on the full dot memory 17 (18) is completed while turned "OFF" when the printing of contents of the full dot memory 17 (18) on the sheet is, started. Further, the in-transfer flag 1238 is turned "ON" when the printing of contents of the full dot memory 17 (18) on the sheet is started while turned "OFF" when the printing is completed. And the in-discharge flag 1239 is turned "ON" when the printing is completed, while turned "OFF" when the discharging of the sheet into a stacker is completed.

Meanwhile, the sheet-discharge waiting flag 1233 is turned "ON" when there is no empty area for the print data to be stored therein in the page buffer memory 11 and when the page buffer memory 11 stores in the empty waiting area the print data of a page different from the page currently to be stored, while turned "OFF" when the discharging of the sheet of the different page is completed so that the print data, which has been waiting for the empty area, can be stored in the area of the page buffer memory 11.

Further, the development-completion waiting flag 1232 is turned "ON" when there is not empty area for the print data to be stored therein in the page buffer memory 11 and when the memory 11 stores the print data of the same page as its own in the empty waiting area, while turned "OFF" when the development of the print data of the same page as already present in the page buffer memory 11 on the full dot memory 17 (18) is completed, that is, when the development of the partial page is completed. And the full-dot-memory hold-state flag 1231 is turned "ON" simultaneously with the development-completion waiting state and turned "OFF" simultaneously with the completion of discharging of the sheet of the entry page.

With such a structure as mentioned above, when there is a different print data, the print controller 15 has various functions of controlling the printing operation, that is, can save the print data prior to the completion of the discharging of the sheet (storage waiting means), can re-print the page lost due to a sheet jam or the like (re-printing means), and can continue the printing operation (storage restarting means).

Further, when there is the same print data, the print controller 15 an also hold the print data of the same page (storage waiting means), and also can develop on the page buffer the print data already received but not completed as a page to invalidate the data of the page buffer memory 11 and to generate an empty area for the subsequent print data to be stored therein in the page buffer memory 11 (developing means).

And the print controller 15 further can store the subsequent print data and continue the printing operation (storing means), can hold the full dot memory 17 (18) until the completion of the discharging of the sheet (holding means), and can re-print the page lost due to a paper jam or the like (re-printing means), thus ensuring the printing after the occurrence of a paper jam.

Explanation will then be made as to the operation of the present embodiment.

First of all, explanation will be made in connection with a case where when it is desired to store new print data, there is no empty area in the page buffer memory 11 so that the storage of the new print data is awaited until the discharging of the printed sheet of another page is completed, by referring to FIG. 3.

Figure 3:
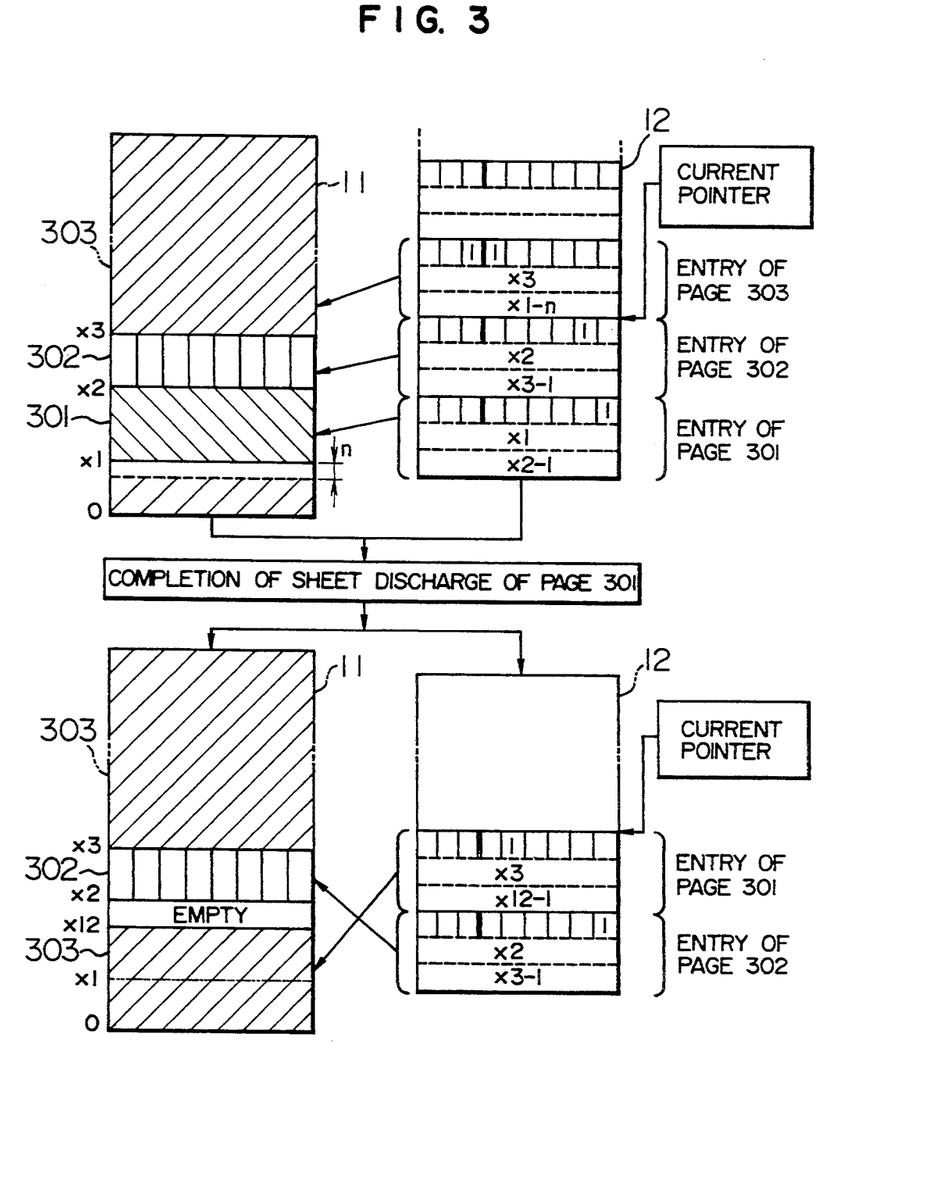
FIG. 3 is a diagram for explaining, when new print data are stored in the embodiment, the operation of the page buffer management table when a page buffer has print data of the discharging page that is different from a page for which the new data are to be stored.

In FIG. 3, its upper section shows a state in which there is no empty area in the page buffer memory 11, i.e., reference numerals 301, 302 and 303 denote the ranges of different pages respectively. This state indicates that, during the discharging of the sheet, the page 303 of the print data during its transfer started storing its print data from a memory address X3 of the page buffer memory 11 and stored its print data until a memory address X1-n, but there is no storage area for the next print data in the page buffer memory and thus the page state management flag 123 is set in its in-preparation and sheet-discharge waiting state (that is, the in-preparation flag 1234 and the sheet-discharge waiting flag 1233 are both set), waiting for the storage of the next print data.

The lower section of FIG. 3 shows a state when the empty area was secure din the page buffer memory 11, that is, the discharging of the sheet of the page 301 is completed so that an area of memory addresses X1 to X2-1 (the address X2-1 being previous to,an address X2 by one address) of the page buffer memory 11 becomes empty, but an area of memory addresses X1 to X12 is already occupied or presented to the page 303, which results in that an area of memory addresses X12 to X2-1 becomes empty, the storage of one page of print data of the page 303 is completed, and the transfer of the page 302 is completed and the page 302 is in its sheet discharging state.

Next, explanation will be made in connection with a case where, when it is desired to store new print data in the page buffer memory 11, there is no empty area in the memory so that the print data of its own page waiting for an empty area must be awaited until the print data is developed on the full dot memory 17 (18) as a dot pattern, by referring to FIG. 4.

Figure 4:
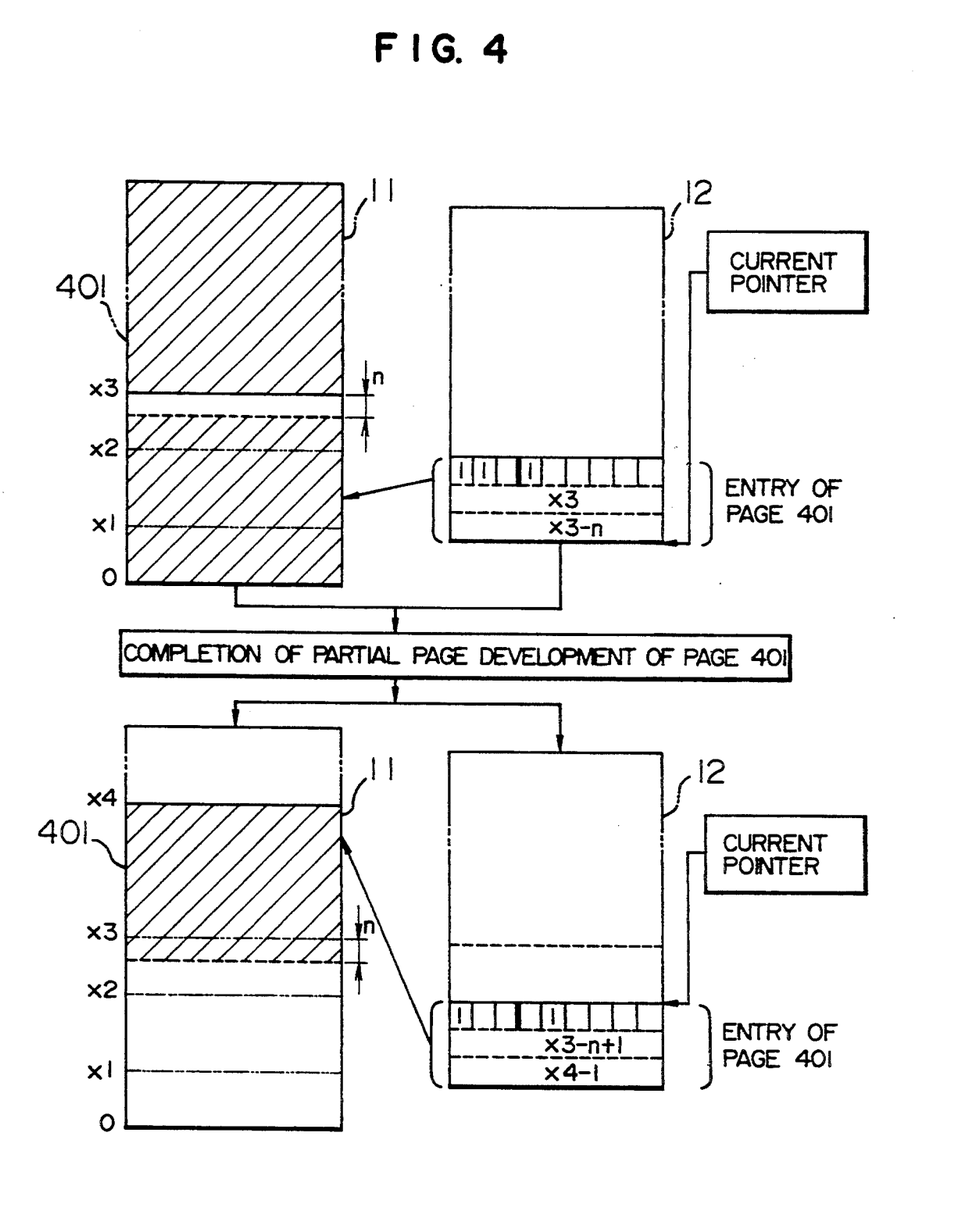
FIG. 4 is a diagram for explaining, when new print data are stored in the embodiment, the operation of the page buffer management table when the page buffer has print data of the discharging page that is the same as a page for which the new data are to be stored.

In FIG. 4, its upper section indicates a state when there is no empty area in the page buffer memory 11. In the state, a page 401 started storing its print data from a memory address X3 of the page buffer memory 11 and stored its print data until a memory address X3-n, but the storage of one page of print data is not completed yet and further there is no area for storage of the new print data in the page buffer memory 11, so that the page state management flag 123 is set in its page preparing, development-completion waiting and full-dot-memory holding state, holding the storage of the next print data.

Further, the lower section of FIG. 4 shows a state when an empty area was secured or reserved. That is, since the development of the print data of the partial page of the page 401 already stored at the memory addresses X3 to X3-n of the page buffer memory 11 is completed on the full dot memory 17 (18) and thus the page 401 has an empty area (the completion of development of the partial page of the page 401); the remaining data of the same page are stored in the empty area of the page buffer memory 11 at memory addresses X3-n+1 to X4-1, the development of the page state management flag 123 is in its development-waiting and full-dot-memory holding state.

Figure 5:
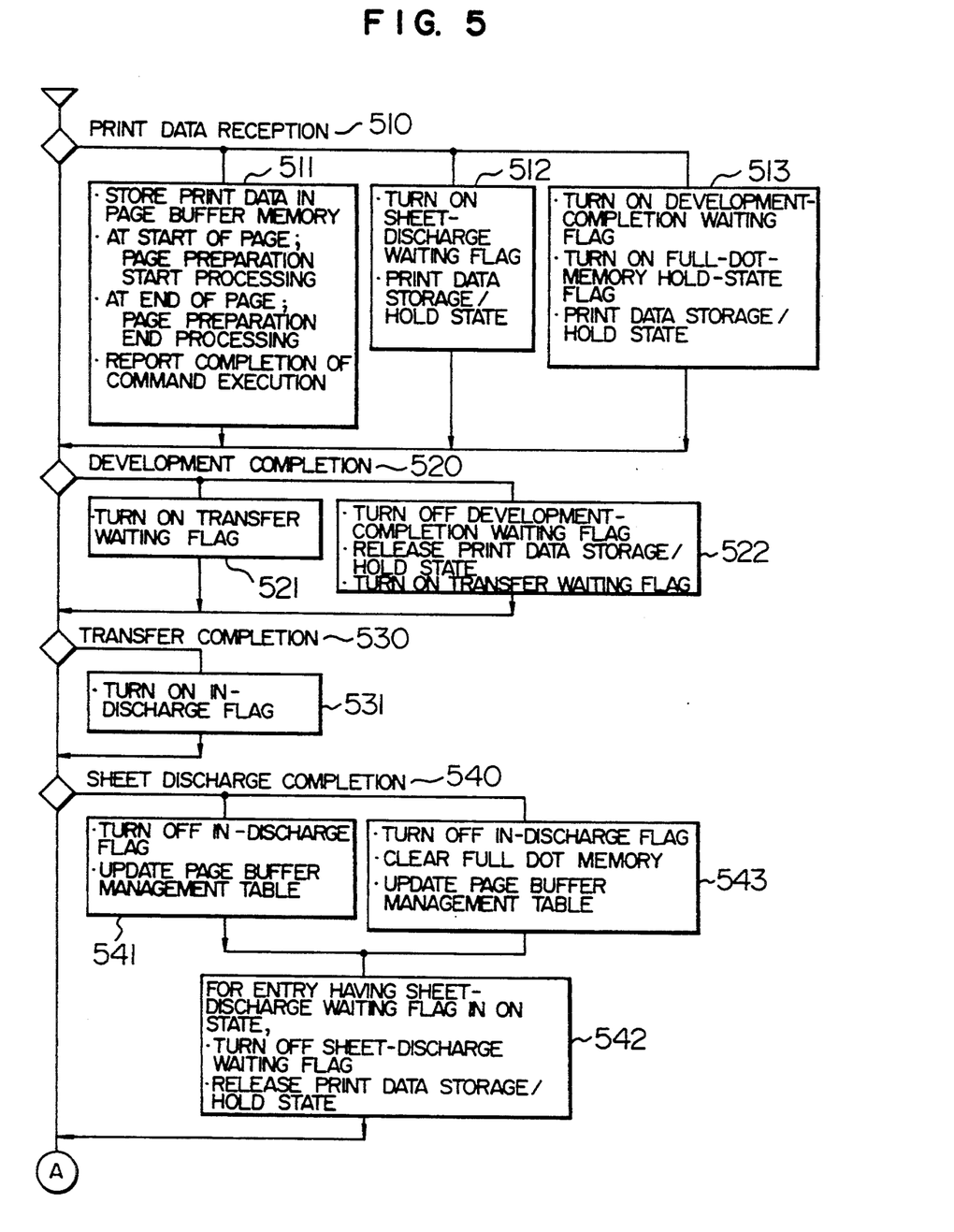
FIG. 5 is a flowchart showing part of printing control in the printer of the present embodiment.
Figure 6:
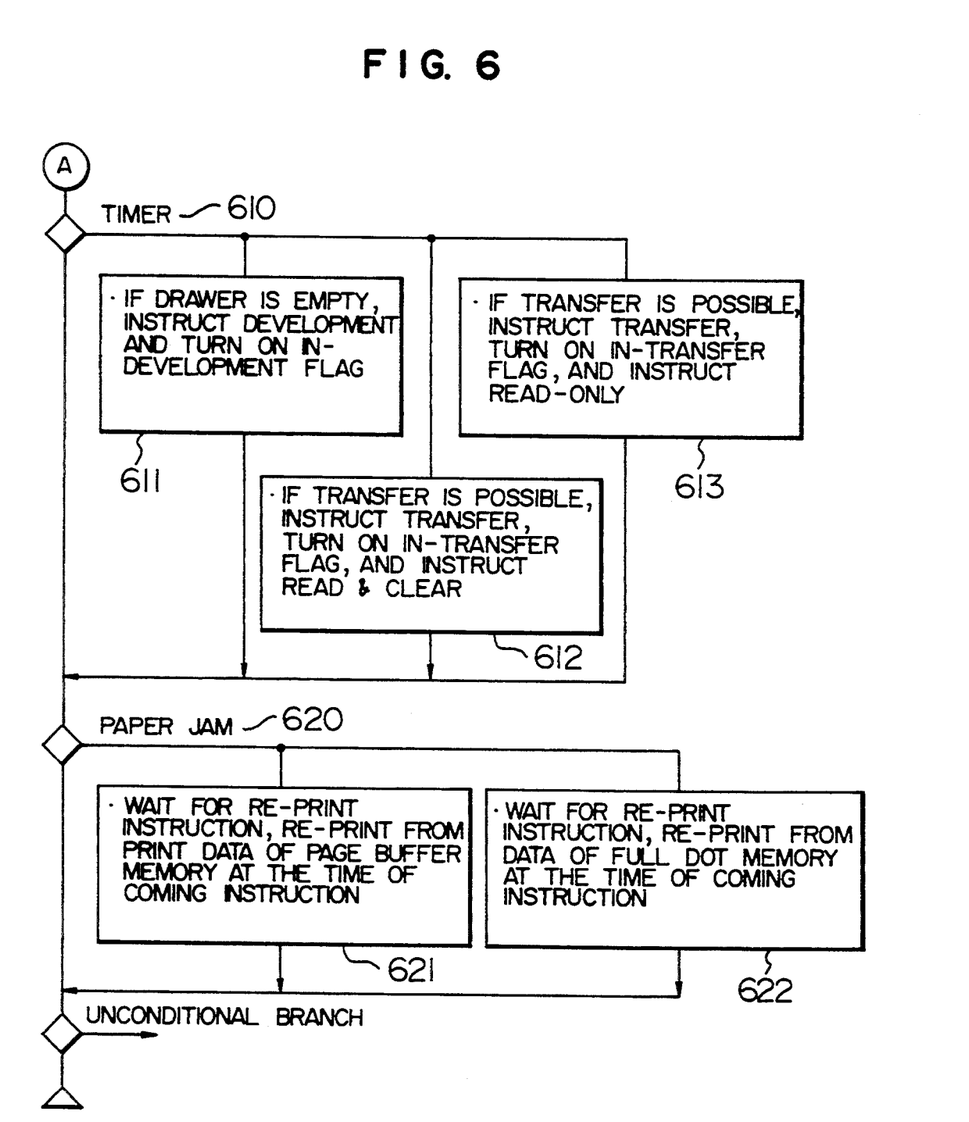
FIG. 6 is a flowchart showing the part of the printing control following FIG. 5 in the printer of the present embodiment.

Explanation will next be made as to the printing control of the print controller 15 with reference to a flowchart of FIGS. 5 and 6 on step-by-step basis.

In a step 510, when the channel controller 14 receives print data according to a command from the host system, it is judged whether or not there is an empty area in the page buffer memory 11 and whether or not the received print data has the same page as its own page (the same page as the discharging page). The presence or absence of an empty area is determined by the page start and end addresses of the page buffer management table 12. More specifically, since the data received by the channel controller 14 contains information indicative of a data length and a page delimiter, it is judged whether or not the received print data has the same page as its own page on the basis of the page delimiter information and the page buffer management table.

In a step 511, the processing is carried out when there is available in the page buffer memory 11 an empty area for the received print data to be stored therein. More in detail, after storing the print data in the page buffer memory 11, the print controller 15 performs the setting of the page start address 121, page end address 122 and page state management flag 123 of the page buffer management table 12, and further issues an instruction to the channel controller 14 to report the completion of the command execution to the host system. Although not illustrated here, the page start address 121 and the page end address 122 are judged by a channel command from the host system.

In the step 512, the processing is carried out when there is not available in the page buffer memory 11 an empty area for the received print data to be stored therein and when the waiting print data has not the same page as its own page. In this case, the print data received from the host system is temporarily held in the intermediate buffer 13 and the print controller 15 holds a report instruction to the channel controller 14 indicative of the completion of command execution to the host system, so that the next print data is awaited and the holding state of storage of the print data is realized.

Further, the sheet-discharge waiting flag 1233 of the page state management flag 123 is turned "ON" to get ready for an empty area of the page buffer memory 11 (the sheet-discharge waiting operation being shown in a step 542).

In a step 513 similar to the step 512, the processing is carried out when the page of the print data waiting for an empty area is the same as its own page. Even in this case, the holding state of storage of the print data is realized by the similar means to the step 512. Further, the development-completion waiting state of the page state management flag 123 is turned "ON" to get ready for an empty area of the page buffer memory 11 (the development-completion waiting operation being shown in a step 611). The full-dot-memory holding state is turned "ON" to ensure the re-printing page at the time of occurrence of a paper jam (shown in step 622). Although not illustrated, at the time of the first-time data storage, the entry indicated by the current pointer is used and when one page is completed, the current pointer is updated by one entry.

When the processing at the time of receiving the data is completed, the data of the page buffer 11 is dot developed by the drawer 16 to be stored in the full dot memory 17. In a step 520, the development of the print data on the full dot memory 17 (18) by the drawer 16 is completed. In a step 521, the development-completion waiting flag 1232 of the page state management flag 123 is its "OFF" state. The transfer waiting flag 1237 is turned "ON".

In a step 522, the development-completion waiting flag 1232 is turned "ON" and the transfer waiting flag 1237 is turned "ON" so that the print data previously stored in the intermediate buffer 13 is stored in the page buffer memory 11 and the print controller 15 issues to the channel controller 14 an instruction indicative of the completion of command execution, whereby the print-data storage holding state is released to continue the printing operation. Although not illustrated, when the print controller 14 detects the development completion, it examines the entries from the lowest entry of the page buffer management table 12 to the entry indicated by the current pointer to perform the aforementioned processing over only the entry being developed.

In a step 530, the printer mechanism interface controller 19 completes its transmission of the print pattern of the full dot memory 17 (18) to the printer mechanism 2 and the transfer of the print pattern to the sheet is completed. In a step 531, the in-discharge flag of the page state management flag 123 is turned "ON" to get ready for the transfer of the next page (the transfer of the next page being carried out in a step 612 or 613). Although not illustrated, when the print controller 15 detects the transfer completion, it examines the entries from the lowest entry of the page buffer management table 12 to the entry indicated by the current pointer to perform the foregoing processing over the entry being transferred.

In a step 540, the value of the picked-up sheet counter 22 within the printer mechanism 2 is read out and the sheet-discharging state is checked on the basis of the read-out value and the completion of sheet discharging by one page is judged. In a step 541, the processing is carried out over the entry having the in-discharge flag of the page state management flag 123 in its "ON" state and having the full-dot-memory holding flag in its "OFF" state.

In the step 542, the entry having the sheet-discharge waiting flag in its "ON" state is processed. In this case, when the print data of the intermediate buffer 13 which storage is being held can be stored in the empty area available as a result of the completion of the sheet discharge, the holding state of storage of the print data is released as in the step 522. If the print time cannot be stored, the condition is continued to get ready for the completion of sheet discharge of the next page.

In a step 543, processing is carried out over the entry having the in-discharge flag in its "ON" state and having the full-dot-memory hold-state flag in its "ON" state. In this case, the print controller 15 issues to the printer mechanism interface controller 19 an instruction to clear the full dot memory 17 (18) held until the completion of the sheet discharge and gets ready for the completion of its clearing operation. When the print controller 15 detect the completion of sheet discharge, since the lowest entry of the page buffer management table 12 necessarily satisfies the conditions of either one of the steps 541 and 543, the entry is carried out in either one of the steps. Further, the entries of the page buffer management table 12 are sequentially shifted in its lower direction by one entry to update the page buffer management table 12.

Further, the entries from the lowest entry to entry indicated by the current pointer are examined so that, when there is present a sheet-discharge waiting entry in the entries, the processing of the step 542 is carried out.

In a step 610, the processing of the print controller 15 is carried out at intervals of a constant time. The print controller 15 incorporates a timer and thus the processing of the step 610 is carried out at intervals of the constant time set by the timer.

In the step 511, processing is carried out over the entry having development-completion waiting flag or development waiting flag of the page state management flag 123 in its "ON" state. When the drawer 16 is empty, the print controller 15 issues an instruction thereto to develop the page in question on the empty full dot memory 17 (18).

At this time, the print controller 15 designates the page start and end addresses 121 and 122 of the page buffer management table 12 of the page in question. Although not illustrated, the decision of the entry having development-completion waiting flag development waiting flag in its "ON" state is made by examining the entries from the lowest entry of the page buffer management table 12 to the entry indicated by the current pointer and by finding such an entry that satisfies the above conditions from the entries.

In the step 612, when there is no entry having the in-transfer flag in its "ON" state in the page buffer management table 12, the entries of the page buffer management table 12 are examined starting from its lowest entry so that, when such an entry as to have the first-time transfer waiting flag in its "ON" state is found, processing is carried out over such an entry. However, the full-dot-memory hold-state flag of the entry in question must be in the "OFF" state.

In order to print the page of the entry in question, the print controller 15 issues to the printer mechanism interface controller 19 a command to transfer the page of the associated entry to the full dot memory 17 (18). At this time, the reading operation of the full dot memory 17 (18) is instructed to be carried out by the READ & CLEAR method. This causes the printer mechanism interface controller 19 to issue a sheet pickup instruction to the printer mechanism controller 21 and also to send the dot pattern thereto.

In the step 613, when there is no entry having the in-transfer flag in its "NO" state in the page buffer management table 12, the entries of the page buffer management table 12 are examined starting from its lowest entry so that, when such an entry as to have the first-time transfer waiting flag in its "NO" state is found, processing is carried out over such an entry. However, the full-dot-memory hold-state flag of the entry in question must be in the "ON" state.

In order to print the page of the entry in question, the print controller 15 issues to the printer mechanism interface controller 19 a command to transfer the page of the associated entry to the full dot memory 17 (18). At this time, the reading operation of the full dot memory 17 (18) is instructed to be carried out by the READ-ONLY method. This causes the printer mechanism interface controller 19 to issue a sheet pickup instruction to the printer mechanism controller 21 and also to send the dot pattern thereto.

In a step 620, the printer controller 1 detects a paper jam occurred in the printer mechanism 2.

In a step 621, when the full-dot-memory hold-state flag of the page state management flag 123 for the re-printing start page is in its "OFF" state, a re-print instruction is awaited after the recovery of the paper jam (through not illustrated, this instruction is issued by means of a start switch of the printer controller 1 or the like) and when the re-print instruction is issued, the re-printing operation is started. At this time, the start page of the re-printing operation is found in the following manner on the basis of the contents of the picked-up sheet counter 22 and page buffer management table 12. That is, the picked-up sheet counter 22 indicates the number of sheets which are picked up but not discharged. A total of the numbers of entries during transferring operation and during discharging operation in the page buffer management table 12 corresponds to the number of sheets picked up.

From the above consideration, a value obtained by subtracting the value of the picked-up sheet counter 22 from the above picked-up sheet number corresponds to an already-discharged sheets number at the time of the occurrence of the sheet jam. Therefore, ones of the entries of the page buffer management table 12 during the transferring operation and during the discharging operation corresponding to the above already-picked-up sheets number are already discharged and thus the re-printing operation is started from the subsequent entry (counting means). And the re-printing operation is done by rewriting the states of all the entries during the transferring operation and during the discharging operation into the development waiting states and by restarting the execution of the flowchart of the steps 510 to 620.

In the step 622, the re-print start page is found in the similar manner to the step 621 and the full-dot memory hold-state flag of the page state management flag 123 of the re-print start page is in its "ON" state. In this case, re-printing operation is carried out based on the full dot memory 17 (18) and this full dot memory 17 (18) is held until the sheet discharge is completed.

And as in the above, the pages to be reprinted are processed, the in-transfer flag of the entry (the lowest entry of the page buffer management table 12) having the full-dot-memory hold-state flag in the "ON" state is turned "ON" and the in-discharge flag thereof is turned "OFF", so that the print controller 15 issues to the printer mechanism interface controller 19 a command to print the ensured print data from the full dot memory 17 (18). At this time, as already explained above, the reading operation of the full dot memory 17 (18) is carried out by the READ-ONLY method which forms one of the features of the present invention, while the full dot memory 17 (18) is held.

Explanation will then be sequentially made as to the operational flow from the actual reception of print data to its printing operation.

First, when receiving print data from the host system, the channel controller 14 informs the print controller 15 of the fact of its data reception. The print controller 15 knows the reception of the print data in the step 510.

In this case, when the print data of the page being discharged, which page is different from the page to be newly stored, still remain, the storage of the new print data is held as shown in FIG. 3. Thereafter, when an empty area becomes available in the page buffer memory 11, the holding state of the storage of the print data is released to continue its printing operation.

More in detail, when the print data of the page 303 is first received, the received print data judged in the step 510. At this time, the length of the print data is compared with the empty area (corresponding to the page 301 of the page buffer memory 11 in FIG. 3) of the page buffer memory 11. Since the empty area is smaller than the print data length in this case, the execution of the step 512 causes the page buffer management table 12 to be put in such a state as shown by the upper section of FIG. 3, so that the storage of the print data is held (storage waiting means).

Thereafter, when the completion of the sheet discharge is detected, the discharge completion judgement conditions of the step 540 are satisfied. At this time, since the page 303 is of the sheet-discharge waiting entry, the holding state of the print data is released and the storage of the print data is restarted in the step 542 (storage restarting means).

In this way, the completion of discharge of the sheet having another page into the stacker is awaited, after which the storage of the new print data into the page buffer memory 11 is controlled.

Meanwhile, when the page of the print data being discharged is the same as the page of the print data to be newly stored, the similar processing to in FIG. 4 is carried out in the following manner, except that the data of the page buffer memory 11 waiting for an empty area has the same page as the data now being processed.

First, when the print data of the page 401 is received, the received print data is judged in the step 510. At this time, since the empty area is small and the page of the received print data is the same as the page of the print data being processed, the processing of the step 513 is carried out so that the page buffer management table 12 is put in such a state as shown by the upper section of FIG. 4 and the storage of the new print data is held (storage waiting means).

Thereafter, the development-completion waiting flag of the page state management flag 123 set by the above operation causes the step 611 to be executed so that the print data of the partial page from the memory address X3 to the memory address X3-n in the page buffer memory 11 are developed on the full dot memory 17 (or 18) (developing means).

Further, when the completion of the development is reported from the drawer 16, the completion of the development is judged in the step 520. At this time, since the entry having the development-completion waiting flag in the "ON" state is prepared, the step 522 is executed. This causes the holding state of the print data to be released so that the storage thereof to the page buffer 11 is started (storage means).

And when the storage of the print data corresponding to one page is completed, the full-dot-memory hold-state flag and development waiting flag of the page state management flag 123 are both turned "ON".

Further, this entry exists as the lowest entry of the page buffer management table 12. In the development instruction in this condition, when the development is completed, the step 521 is executed to turn the transfer waiting flag "ON". In the transfer waiting state, since the full-dot-memory hold-state flag is also in the "ON" state, the transfer waiting state is processed in the step 613. For this reason, an instruction is issued to read out the full dot memory 17 (or 18) by the READ-ONLY method (holding means).

Since such control as mentioned above is carried out over the printing operation, when a paper jam takes place in the printer mechanism 2, the step 621 is processed so that the data of the page buffer memory 11 can ensure the print data after the recovery of the paper jam, and the step 622 is processed so that the data of the full dot memory 17 (or 18) can ensure the print data after the recovery of the paper jam even when one page of print data cannot be stored in the page buffer memory 11 (re-printing means).

Accordingly, in accordance with the printer of the present invention, when the new print data is received but it is judged that the page buffer memory 11 is occupied by the print data of another page of the page buffer memory 11 being discharged, the storage of the new print data is awaited until the discharge of the print sheet of the other page into the stacker is completed, at which the new print data is stored in the page buffer memory 11 so that the printing operation can restarted from the print data stored in the page buffer memory 11.

Meanwhile, when the page buffer memory 11 is occupied by the print data of the same page as the new print data, the storage of the new print data is awaited until the print data of the page being processed is developed on the full dot memory 17 (18) as a dot pattern, after which the new print data is stored in the page buffer memory 11 so that the printing operation can be restarted from the print data stored in the full dot memory 17 (18).

As a result, even when a paper jam occurs, the paper jam can be recovered by the page buffer memory 11 or the full dot memory 17 (18). In addition, even when the print data is not determined in its upper limit per page, the use of the page buffer memory 11 and full dot memory 17 (18) alone each having a suitable capacity enables the invention to cope with even such print data as to exceed the capacity of the page buffer memory 11 by saving the page in the full dot memory 17 (18).

Although the present invention has been detailed with reference to the foregoing embodiment, it should be understood that the present invention is not limited to the specific example but may be modified in various ways within the spirit and scope of the invention.

For example, the recovery of a paper jam caused by abnormal sheet feed has been explained in the printer of the foregoing embodiment, but the present invention is not restricted to the above embodiment but can be widely applied to even the recovery of an abnormality in mutual print output between the printer controller 1 and printer mechanism 2.

What is claimed is:

1. A method for controlling printing operation of a printer having a buffer memory for temporarily storing print data and a full dot memory for saving a page of print data in a dot pattern form, said method comprising the steps of:
    when there is new print data to store in said buffer memory and said buffer memory does not have an empty area for said new print data to be stored therein, determining the presence of:
    a first state in which the buffer memory is storing print data of a first page being printed and, the new print data is of a second page being different from the first page, or
    a second state in which the buffer memory stores print data of the first page and a portion of the second page;
    in response to determining the presence of the first state, storing the new print data in said buffer memory after printing of a first sheet corresponding to the first page is completed; and
    in response to determining the presence of the second state, developing the print data stored in said buffer memory into said full dot memory in a first dot pattern, and after completion of the development, storing the new print data in said buffer memory while holding the first dot pattern in the full dot memory.

2. A method for controlling printing operation of a printer as set forth in claim 1, further comprising the step of printing the print data held in said full dot memory, and wherein, in said printing step, when the presence of the first state is determined, the first dot pattern is read out from said full dot memory by a READ & CLEAR method and printed, and, when the presence of the second state is determined, the first dot pattern is read out from said full dot memory by a READ-ONLY method and printed.

3. A method for controlling printing operation of a printer as set forth in claim 2, further comprising the steps of:
    detecting a print abnormality occurring in said printer; and
    when said print abnormality is detected in said detection step and when the print data of the first page is present in said buffer memory, restarting its printing operation from the print data stored in said buffer memory, while when the print data of the first page and the second page is present in the buffer memory, restarting its printing operation from the print data held in said full dot memory.

4. A method for controlling printing operation of a printer as set forth in claim 2, wherein said detected print abnormality is a paper jam.

5. A printer comprising:
    a buffer memory for temporarily storing print data;
    a drawer for receiving said print data from said buffer memory and for developing the print data in a dot pattern;
    a full dot memory for storing said dot pattern developed by said drawer on a page basis;
    a buffer memory management table for managing a page state of the print data;
    a printer mechanism for feeding a sheet to a predetermined print position and for receiving said dot pattern from said full dot memory to perform a printing operation; and
    a controller for controlling said buffer memory, said drawer, and said full dot memory in accordance with contents of said buffer memory management table,
    wherein, when there is new print data of a second page to be stored in said buffer memory, said controller:
    accesses the contents of said buffer memory management table to determine whether an empty area exists in said buffer memory for said new print data, and in response to detecting that the buffer memory has no empty area, determining the presence of (i) a first state in which only print data of a first page being discharged is present in said buffer memory, or (ii) a second state in which print data of the first page and the second page is present in the buffer memory;
    stores the new print data in said buffer memory after discharge of a first sheet of the first page is completed in response to detecting the presence of the first state;
    develops the print data of the first page stored in said buffer memory on said full dot memory in a first dot pattern in response to detecting the presence of the second state; and
    after completion of the development, stores the new print data in said buffer memory while holding the first dot pattern in the full dot memory.

6. A method for controlling printing operation of a printer as set forth in claim 5, wherein said controller, in printing, when the print data of the first page being discharged is present in said buffer memory, reads out the first dot pattern from said full dot memory by a READ & CLEAR method and sends it to said printer mechanism, while, when the print data of the first page being discharged and the second page of the new print data is present in the buffer memory, reads out the first dot pattern from said full dot memory by a READ-ONLY method and sends it to said printer mechanism.

7. A printer as set forth in claim 6, further comprising a channel controller for receiving a command and print data from an upper system, and an intermediate buffer for temporarily storing therein the print data prior to storage thereof in said buffer memory.

8. A printer as set forth in claim 7, further comprising a picked-up sheet counter for counting a number of printed sheets already discharged, and wherein said controller judges on the basis of information reported from said picked-up sheet counter whether the page present in said buffer memory is the page whose discharge is completed.

9. A printer as set fourth in claim 8, further comprising an abnormality detector for detecting a print abnormality occurring in said printer, and wherein said controller, in response to detection of said print abnormality, restarts the printing operation from the print data stored in said buffer memory when the print data of the first page being discharged is present in said buffer memory, and restarts the printing operation from the print data of the first page held in said full dot memory when the first print data of the first page being discharged and the second page of the new print data is present in the buffer memory.

10. A printer as set forth in claim 9, wherein said detected print abnormality is a paper jam.

11. A printer controller comprising:
   a receiver for receiving a command and print data from an upper system;
   a buffer memory for temporarily storing therein the print data;
   a drawer for receiving the print data from said buffer memory, dot developing into a dot pattern and outputting said dot pattern;
   a full dot memory for storing therein said dot pattern developed by said drawer on a page basis;
   an interface for receiving the dot pattern from said full dot memory and sending the dot pattern to a printing means; and
   a controller, in response to said command received by said receiver, for controlling the sending of the print data to said printing means in the dot pattern, and wherein, when it is desired to store new print data in said buffer memory, said controller judges whether an empty area in said buffer memory exists for said new print data to be stored therein, in response to judging that the buffer memory has no empty area for the new print data determining the presence of (1) a first state in which print data of a first page being discharged is present in the buffer memory and the new print data is of a second page different from a first page or (2) a second state in which print data of the first page being discharged and the second page of the new print data is present in the buffer memory, the controller (i) storing the new print data in said buffer memory after discharge of a first sheet of the first page is completed when the print data of the first page is present in said buffer memory, (ii) developing the print data stored in said buffer memory into said full dot memory in a first dot pattern when the print data of the first page being discharged and the second page of the new print data is present in the buffer memory, (iii) and after completion of the development, storing the new print data in said buffer memory while holding the first dot pattern in the full dot memory.

12. A printer controller as set forth in claim 11, wherein said controller, in printing, when the print data of the first page being discharged is present in said buffer memory, reads out the first dot pattern from said full dot memory by a READ & CLEAR method and sends it to said interface, while, when the print data of the page being discharged and the second page of the new print data is present in the buffer memory, reads out the first dot pattern from said full dot memory by a READ-ONLY method and sends the first dot pattern to said interface.

13. A printer controller as set forth in claim 12, wherein said interface receives a signal from said printing means, and wherein said controller, when said interface receives a notification indicative of occurrence of a print abnormality from said printing means, restarts sending of the print data to said printing means from the print data stored in said buffer memory when the print data of the page being discharged is present in said buffer memory, while restarts sending of the print data to said printing means from the print data held in said full dot memory when the print data of the first page being discharged and the second page of the new print data is present in the buffer memory.

14. A printer controller as set forth in claim 13, wherein said notification indicative of occurrence of a print abnormality refers to occurrence of a paper jam.

15. A print control method in a printer apparatus which comprises a buffer memory for temporarily storing print data, and a full dot memory for storing pages of print data in a dot pattern, said print control method comprising the steps of:
   reading a dot data through a READ & CLEAR operation from the full dot memory when all print data for the dot data are present in the buffer memory;
   reading the dot data through a read only operation from the full dot memory when a part or all of the print data is not present in the buffer memory; and
   printing the read dot data on a sheet of paper.

16. A method for controlling printing operation of a printer according to claim 15 wherein the printer apparatus further has a jam detector for detecting a paper jam, said method further comprising the steps of:
   when an area for storage of a new print data is not present in said buffer memory, comparing a second page of said new print data with a first page of a first print data of said buffer memory of a first sheet being discharged, and when the page of the first sheet being discharged is determined to be different from the second page of the new print data, judging that the first print data of the same page as the print data being discharged is present;
   when a paper jam is detected by said jam detector and when the first print data of the first page is present in said buffer memory, restarting the printing operation from the first print data stored in said buffer memory; and
   when the first print data being discharged and having the second page of the new print data is present in said buffer memory, restarting the printing operation from the first print data held in said full dot memory.

17. A method for controlling printing operation of a printer apparatus as set forth in claim 16, further comprising the step of counting a number of printed sheets already discharged, and wherein whether said first page is completed in discharge or during discharge is judged by count value of said number of printed sheets already discharged.

18. A print control method in a printer apparatus which comprises a buffer memory for temporarily storing print data, and a full dot memory for storing pages of print data in dot pattern form, said print control method comprising the steps of:

determining whether a storage area exists for a new print data in the buffer memory when the new print data is to be stored in the buffer memory;

when it is determined that the storage area does not exist, determining whether there is in the buffer memory a first print data of a first page, the first data being different from a second page in which the new print data is to be included, or only a second print data of the second page;

when it is determined that the first print data exists, suspending a storing process of the new print data in the buffer memory, reading a first dot data corresponding to the first print data through a READ & CLEAR operation from the full first dot memory which stores the dot data corresponding to the first print data to execute a print operation of the first dot data on a sheet of paper, and storing the new print data in the buffer memory after the sheet of paper for the first page is ejected;

when a print abnormality occurs before the sheet of paper for the first page is ejected, reading out the first print data stored in the buffer memory to re-execute the print operation;

when it is determined that only the second print data exists in the buffer memory, storing the new print data in the buffer memory after the second print data is expanded as a second dot data in the full dot memory, expanding the new print data as an additional second dot data in the full dot memory to have a completed second dot data for the second page, and then reading the completed second dot data from the full dot memory through a read only operation to execute the print operation on a sheet of paper; and when a print abnormality occurs before the sheet of paper for the second page is ejected, reading the second print data for the second page from the buffer memory to execute the print operation on a sheet of paper again.

19. A print control method in a printer apparatus which comprises a buffer memory for temporarily storing print data, and a full dot memory for storing pages of print data in dot pattern form, said print control method comprising the steps of:

determining whether a storage area exists for a new print data in the buffer memory when the new print data is to be stored in the buffer memory;

when it is determined that the storage area does not exist, storing the new print data in the buffer memory after the print data stored in the buffer memory is expanded as a dot data in the full dot memory;

reading the dot data from the full dot memory through a read only operation to execute a print operation of the read dot data on a sheet of paper; and allowing a content of the full dot memory to be cleared after a printed sheet of paper is ejected from the printer apparatus.

20. A print control method in a printer apparatus which comprises a buffer memory for temporarily storing print data, and a full dot memory for storing pages of print data in a dot pattern, said print control method comprising the steps of:

determining whether a storage area exists for a new print data in the buffer memory when the new print data is to be stored in the buffer memory;

when it is determined that the storage area does not exist, determining whether a first page for a dot data present in the full dot memory is the same as a second page for the new print data;

when it is determined to be different, suspending a storing process of the new print data in the buffer memory;

storing the new print data in the buffer memory after a printed sheet of paper for a leading page of a first print data stored in the buffer memory is ejected;

when a print abnormality occurs before the printed sheet of paper for the leading page is ejected, reading out the first print data for the leading page from the buffer memory to execute a print operation on another sheet of paper again;

when it is determined to be the same, storing the new print data in the buffer memory after the first print data stored in the buffer memory is expanded into a first dot data in the full dot memory;

expanding the new print data into an additional dot data in the full dot memory;

reading the first dot data from the full dot memory through a read only operation to execute the print operation on a sheet of paper; and when a print abnormality occurs before the sheet of paper is ejected, reading the first dot data from the buffer memory to re-execute the print operation.

* * * * *